United States Patent [19]

Fetzer et al.

[11] Patent Number: 4,603,976

[45] Date of Patent: Aug. 5, 1986

[54] OPTICAL MARK RECOGNITION APPARATUS

[75] Inventors: Günter Fetzer, Gundelfingen; Jürgen Erdmann, Waldkirch, both of Fed. Rep. of Germany

[73] Assignee: Erwin Sick GmbH Optik-Elektronik, Waldkirch, Fed. Rep. of Germany

[21] Appl. No.: 501,723

[22] Filed: Jun. 6, 1983

[30] Foreign Application Priority Data

Nov. 15, 1982 [DE] Fed. Rep. of Germany ....... 3242219

[51] Int. Cl.⁴ ............................ G01J 3/46; G06K 7/12
[52] U.S. Cl. ..................................... 356/402; 235/455; 235/469; 250/555; 250/566; 356/71; 356/445
[58] Field of Search ............ 356/71, 402, 445–448; 250/566, 555, 556, 559, 571; 235/469, 465, 455

[56] References Cited

U.S. PATENT DOCUMENTS

| | | | |
|---|---|---|---|
| 3,225,177 | 12/1965 | Stites et al. | 235/465 |
| 3,632,993 | 1/1972 | Acker | 235/469 |
| 3,684,868 | 8/1972 | Christie et al. | 250/555 X |
| 3,814,943 | 6/1974 | Baker et al. | 356/71 X |
| 3,922,090 | 11/1975 | Fain | 356/71 |
| 3,972,616 | 8/1976 | Minami et al. | 356/71 |
| 4,299,443 | 11/1981 | Minami et al. | 356/71 |

FOREIGN PATENT DOCUMENTS 2328269 12/1973 Fed. Rep. of Germany.
2515656 12/1981 Fed. Rep. of Germany.

OTHER PUBLICATIONS

Roberts, "Optimized Tape Mark Detector", IBM Technical Disclosure, vol. 12, No. 12, May 1970, pp. 2354–2355.
Kosanke et al, "Compensator for Light Deflector", IBM Tech. Dis., vol. 10, No. 1, Jun. 1967, p. 58.

Primary Examiner—Vincent P. McGraw
Assistant Examiner—Robert D. V. Thompson, III
Attorney, Agent, or Firm—Townsend & Townsend

[57] ABSTRACT

In optical mark recognition apparatus the light transmitter has two light sources 11, 12 which can be selectively switched on and which transmit light beams of different spectral compositions. A semi-permeable mirror 15 directs the light beams 13, 14 of both light sources 11, 12 along a common optical path 16 (FIG. 1).

10 Claims, 1 Drawing Figure

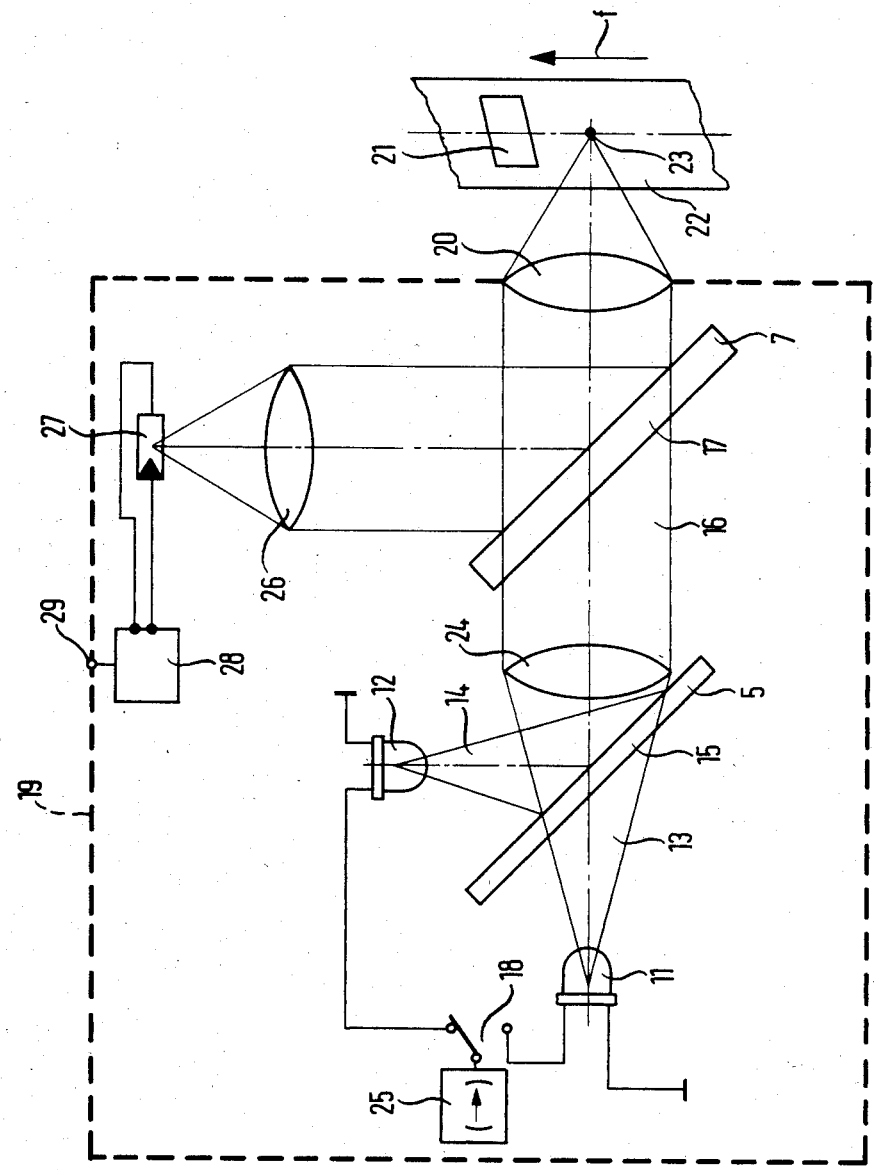

OPTICAL MARK RECOGNITION APPARATUS

The invention relates to optical mark recognition apparatus comprising a light transmitter for transmitting a light beam of variable spectral composition to a carrier bearing optical recognition marks, and a light receiver which receives light remitted from the carrier and from the marks and directs itto a photoreceiver connected to an electronic processing circuit for generating a mark recognition signal.

In packaging, printing and foil welding machines e.g. markings (printed marks) printed onto the material to be packed are used for the control and/or regulation of machines. An optical mark recognition device scans the printed marks during the movement of the material to be processed, which forms the mark carrier. That is to say the optical mark recognition apparatus recognises the passage of the printed marks and provides a corresponding electrical signal. The conversion of the optical information into an electrical signal is achieved by illuminating the object which is to be observed by the optical mark recognition apparatus using an inbuilt light source and by measuring the remission values with a light receiver which is likewise located in the scanner. The electrical output signal of the light receiver is compared with an adjustable boundary value and, depending on the quantity of light received by the light receiver, either exceeds or falls short of this boundary value. Depending on whether the received quantity of light exceeds or falls short of the boundary value an unambiguous yes/no signal is indicated at the output of the optical mark recognition device.

The contrast between the mark carrier and the printed mark is the actual input information for the mark recognition apparatus. It is determined, amongst other things, by the colour and colour saturation of the mark and of the mark carrier, and also by the effective spectrum of the light beam transmitted by the mark recognition apparatus. The effective spectral range is determined by the spectral sensitivity of the light receiver and by the emission spectrum of the light transmitter.

As different colours are used for the printed marks and for the mark carriers ideal contrast is obtained in the known apparatus of the initially named kind by the selective use of a colour filter which varies from case to case and which optimises the effective working spectrum. Mark recognition apparatus is also known in which interchangeable photoreceivers with different spectral sensitivities are used. The disadvantage of these known devices lies in the complicated exchange of the filter or of the photoreceiver as the housing must be opened for this purpose.

The principal object underlying the present invention is thus to provide an optical mark recognition apparatus of the initially named kind in which the spectral working range of the light transmitter can be shifted in simple manner without any form of conversion work or additions having to be made outside or indeed inside the apparatus.

In order to satisfy this object the invention envisages an arrangement in which the light transmitter comprises a plurality of selectively switchable light sources, and especially two light sources, which transmit light beams of different spectral compositions, and in which light beam superimposing means direct the light beams of all the light sources along a common optical path.

In this manner the light source which is ideally suited to a particular mark recognition problem can in each case be selected by a simple electrical change-over switch. I.e. there is no need either to tamper with the apparatus or to exchange filters. It is admittedly already known (from the Journal "Laser and Electro-Optic", No. 6/1973, pages 13, 14) to use either a laser or a high pressure lamp as a light source in an optical surface monitoring device in order to be able to recognise either scratches in metal sheets and lack of homogeneity in transparent foils or larger faults with different colourings. The different light sources are however brought into use by pivotal movement of a plane mirror. Thus, in this known embodiment, a component essential for the precision of the apparatus must be mechanically moved within the optical beam path. This signifies a high degree of complication and cost on the one hand and, on the other hand, can lead to lack of accuracy and susceptibility of the apparatus to breakdown. In accordance with the present invention the two or more light sources are in contrast unified by stationary light beam superimposing means and are merely switched on and brought into operation at different times by a suitable electrical change-over switch.

The light sources can comprise differentially filtered incandescent lamps. They are however preferably luminescent diodes having different spectral ranges. A practically universally usable arrangement is obtained by employing two luminescent diodes as the light sources with one of the diodes emitting in the red spectral range and the other in the green or blue spectral ranges. In this way marks in respective complementary spectral ranges can be ideally recognised.

An advantageous practical embodiment is characterised in that the two light sources are arranged at an angle to one another, and in particular at an angle of 90°, and in that the light beams from the two light sources are directed along the common optical path by a beam dividing mirror. The beam dividing mirror should in particular be a semipermeable mirror. Particularly low light losses are occasioned if the beam dividing mirror is a dichroic mirror the spectral transmittance and reflectance of which are matched to the spectral ranges of the light beams to be transmitted and reflected. By way of example the short wave component is reflected by the dichroic beam dividing mirror and the long wave component is transmitted. A dichroic mirror can be constructed so that almost no light losses occur.

In so far as the mark recognition apparatus of the invention operates with an autocollimation system for the light transmitter and the light receiver the apparatus should be arranged so that the second beam divider of the autocollimation system is disposed in the common optical path for the transmitted light beams. In this case two dividing mirrors, in particular semi-permeable mirrors, are arranged one behind the other along the optical axis in the transmitted light beam.

The invention will now be described in the following by way of example only and with reference to the drawing the single FIGURE of which shows a schematic representation of an optical mark recognition apparatus.

As seen in the drawing the optical mark recognition apparatus in accordance with the invention is arranged in a housing 19 which has a front lens 20 at one side. The front lens 20 concentrates a light beam, which may for example be parallel and which extends along an optical path 16, onto the surface of a mark carrier 22 which bears a mark 21. The mark carrier 22 is moved relative to the housing 19 in the direction of the arrow F. In this manner the marks 21 are moved past the point of light 23 generated by the optical mark recognition apparatus.

The transmitted light beam present along the optical path 16, which may be a parallel beam, is selectively generated by a luminescent diode 11 which emits in the green or blue spectral range or by a luminescent diode 12 which emits in the red spectral range. The luminescent diodes 11, 12 are arranged in the housing 19 at an angle of 90° to one another. Between the luminescent diodes 11 and 12 there is located a semi-permeable mirror 15 which reflects a part of the light beam 13 transmitted by the luminescent diode 11 and which transmits a part of the light beam transmitted from the luminescent diode 12. If the semi-permeable mirror 15 is a dichroic mirror then the light is split up spectrally into transmitted and reflected light and virtually no light losses occur. The arrangement of the luminescent diodes 11, 12 and of the semi-permeable mirror 15 are such that the two transmitted or reflected light beams 13, 14 take the same optical path after the semi-permeable mirror 15 and are rendered parallel by a converging lens 24. In this manner the transmitted light beam 16, which is present along the optical path 16, is generated.

The luminescent diodes 11, 12 are jointly connected to an electrical change-over switch 18 which can be energised by a power supply 25. In this manner either the luminescent diode 11 or the luminescent diode 12 can be selectively switched on.

A further beam divider 17, which is arranged parallel to the semi-permeable mirror 15 and which can likewise be constructed as a semi-permeable mirror, is located in the common optical path 16 between the collecting lens 24 and the front lens 20. The task of the beam divider 17 is to reflect the light remitted from the mark carrier 22 and/or the mark 21, which passes through the front lens 20, through an angle of 90° to a further collecting lens 26 which concentrates the received light on a photoreceiver 27. The photoreceiver 27 is connected to an electronic processing circuit 28 which gives a yes/no signal at an output 29 depending on whether the quantity of light (light flux) received in front of the receiver 27 exceeds or falls short of a specified level.

The manner of operation of the mark recognition apparatus of the invention is as follows:

When the carrier 22 is for example white and the mark 21 green or blue the luminescent diode 12, which emits in the red part of the spectrum, is switched on by means of the change-over switch 18. As a result the incident light is ideally remitted by the carrier 22 whereas practically no light is remitted by the mark 21. That is to say that an ideal contrast is present which is very important for the recognition of the mark 21.

If the colour of the mark 21 lies however in the red region and the carrier 22 is now, as previously, white then the luminescent diode 11 is switched on by the change-over switch 18 with the result that the luminescent diode 12 is automatically switched off. Ideal contrast conditions are now once again present.

We claim:

1. In optical mark recognition apparatus comprising:
   a light transmitter for transmitting a beam of light along a first optical path to a carrier bearing optical recognition marks,
   a light receiver and photoreceiver, said light receiver directing light remitted from said carrier and said marks to said photoreceiver, and said photoreceiver providing an electrical signal representative of said remitted light, and
   electronic processing means, connected to receive said electrical signal, for genergting a mark recognition signal,
   the improvement characterized in that said light transmitter comprises:
   a plurality of fixed light sources disposed in separate and distinct locations from one another, each said source providing light of a different characteristic spectral composition for accentuating the contrast between marks and carriers of different characteristic colours;
   means in fixed disposition with respect to said light sources defining a plurality of optical paths having said first optical path in common for directing light from said light sources to said carrier, whereby said plurality of fixed light sources and optical paths define a plurality of independent modes of operation of said apparatus for enhancing the contrast of a plurality of mark-carrier colour combination, whereby said apparatus is continuously operable in each said mode for reading a succession of marks; and
   switch means for selecting and energizing a light source from said plurality of fixed light sources to operate for successive mark readings, thereby selecting one of said modes of operation, said switch means energizing one and only one light source throughout the selected mode of operation.

2. A mark recognition apparatus in accordance with claim 1 and characterised in that the light sourcrs are incandescent lamps with different filters.

3. Mark recognition apparatus in accordance with claim 1 and characterised in that the light sources are luminescent diodes (11, 12) having different spectral ranges.

4. Mark recognition apparatus in accordance with claim 3 and characterized in that said plurality of light sources consists of two luminescent diodes (11, 12), one emitting in the red spectral range and the other in a spectral range including one of the colours green and blue.

5. Mark recognition apparatus in accordance with claim 4 and characterised in that the two light sources (11, 12) are arranged at an angle to one another, in particular at an angle of 90° to one another, and in that the light beams (13, 14) from the two light sources are directed along the common optical path (16) by a beam dividing mirror (15).

6. Mark recognition apparatus in accordance with claim 5 and characterised in that the beam dividing mirror (15) is a semi-permeable mirror.

7. Mark recognition apparatus in accordance with claim 5 and characterised in that the beam dividing mirror (15) is a dichroic mirror (15) the spectral transmittance and reflectance of which are matched to the spectral ranges of the light beams (12, 13) which are to be respectively transmitted and reflected.

8. Mark recognition apparatus in accordance with claim 1 and having an autocollimation system for the light transmitter and the light receiver, characterised in that a beam divider (17) of the autocollimation system is arranged in the common optical path (16) for the transmitted light beams (13, 14).

9. Mark recognition apparatus in accordance with claim 1 and characterised in that the two light sources (11, 12) are energised from the same voltage source via an electrical or electronic changeover switch (18).

10. Electro-optical apparatus for recognizing code marks printed on a carrier, said apparatus comprising first and second light sources for generating first and second light beams of different spectral compositions, wherein said first and second light beams are directed at an angle to one another, a beam dividing mirror positioned in said first and second light beams for transmitting said first light beam along a first optical path and for deflecting said second light beam so that it follows a common optical path portion with said first optical path, lens means for directing said first and second light beams traveling along said common optical path portion onto said carrier, a photoreceiver responsive to light of all wavelengths covered by said different spectral compositions; means for directing light reflected at said carrier to said photoreceiver; an electronic processing circuit for processing signals generated by said photoreceiver in response to received light for recognition of said code marks, respective electrical circuits for energizing said first and second light sources and switch means coupled to said first and second electrical circuits for selecting a respective one of said light sources which ensures the best contrast between said code marks and said carrier to operate continuously for successive mark readings.

* * * * *